Figure 1:
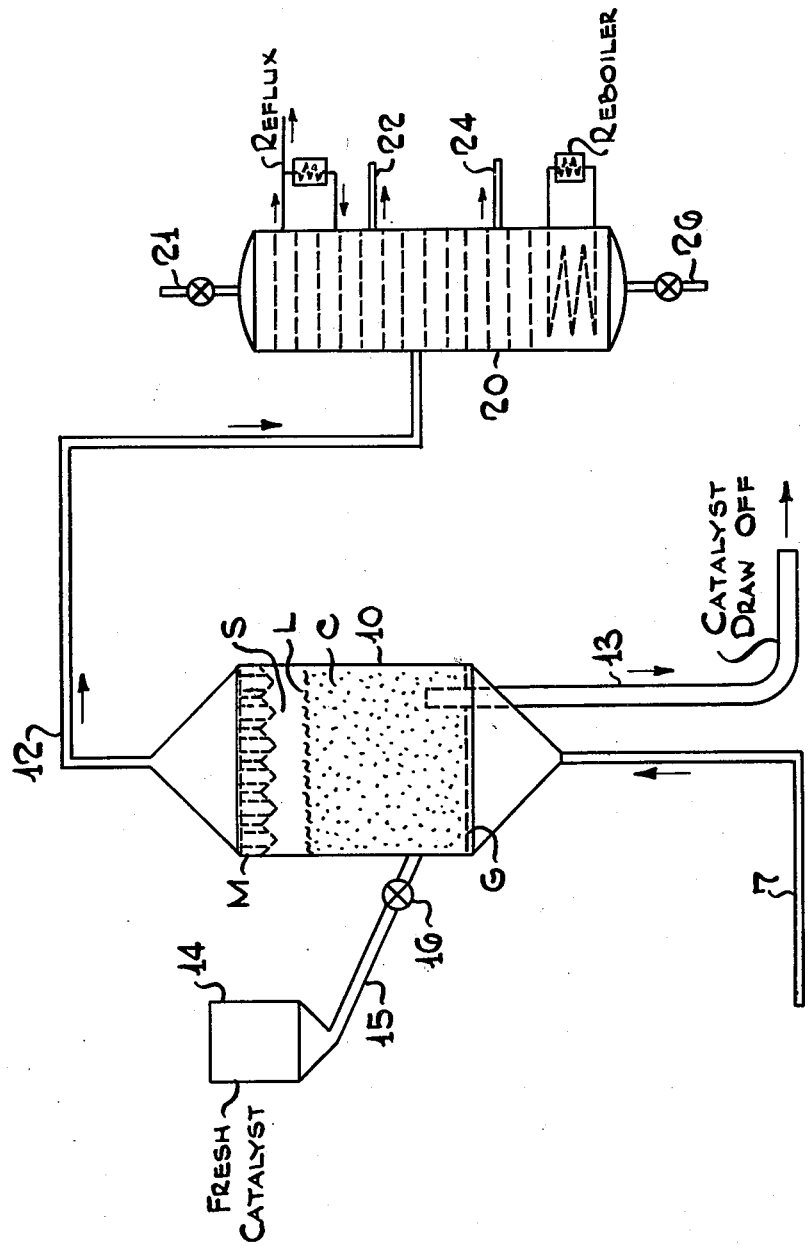

May 31, 1949.  S. B. SWEETSER  2,471,914
SYNTHESIZING HYDROCARBONS
Filed Feb. 14, 1945  2 Sheets-Sheet 1

Sumner B. Sweetser Inventor
By [signature] Attorney

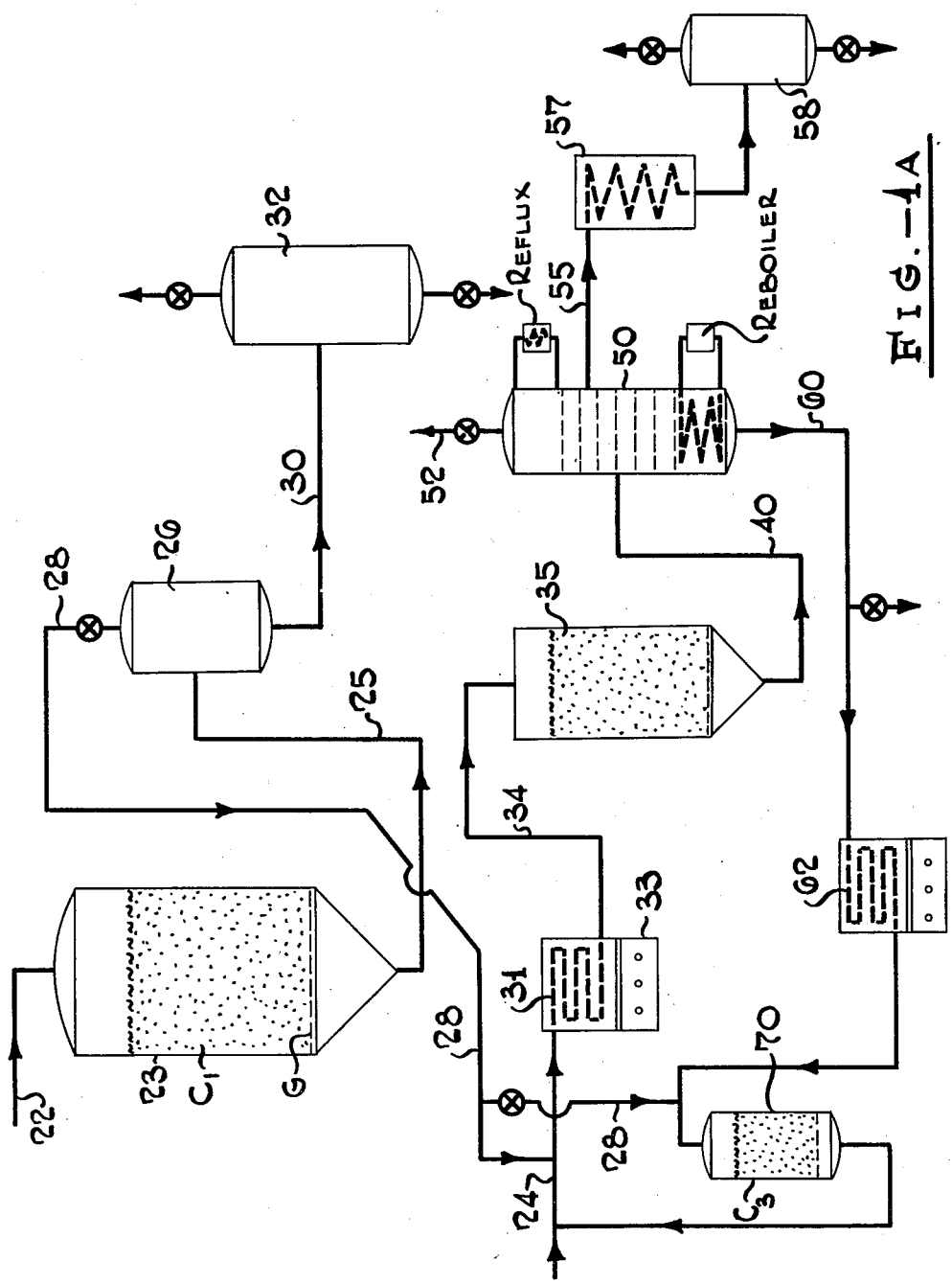

Patented May 31, 1949

2,471,914

UNITED STATES PATENT OFFICE 2,471,914

SYNTHESIZING HYDROCARBONS

Sumner B. Sweetser, Baton Rouge, La., assignor to Standard Oil Development Company, a corporation of Delaware Application February 14, 1945, Serial No. 577,822

7 Claims. (Cl. 196—52)

My invention relates to the novel features hereinafter disclosed in the specification and claims considered in connection with the attached drawing.

The object of my invention is to produce a high quality gasoline and/or aviation fuel from hydrocarbon oil produced synthetically from carbon monoxide and hydrogen.

The hydrocarbon oils normally produced synthetically from carbon monoxide and hydrogen are essentially straight chains in character and therefore unsuitable for use as motor fuel. In carrying my present improvements into effect I first synthesize hydrocarbon oils from CO and hydrogen to produce straight chain paraffins containing small amounts of olefins. Thereafter I subject the product boiling in the gasoline range to aromatization and the product boiling above the gasoline range to either catalytic cracking or destructive hydrogenation and where the gas oil fraction is subjected to destructive hydrogenation, the hydrogen formed during the aromatization is employed in the said destructive hydrogenation operation.

In order to afford a better understanding of my invention, I have provided in the accompanying drawing a flow plan which will serve to illustrate a preferred modification of the said invention.

Referring in detail to the drawing, a mixture of CO and hydrogen properly proportioned enters the system through line 7 and thereafter passes into a synthesis reactor 10 containing a suitable catalyst C which is in the form of a dense suspension in the reaction zone. The catalyst, which is preferably cobalt promoted with a minor amount of thoria, is in the form of a powder having a particle size of 60 to 400 mesh and is maintained in a dense suspension or "fluidized" state by causing the gases to flow upwardly at a linear velocity of, say, 0.2 to 5 feet per second, preferably from 0.2 to 1.5 feet per second. This flow rate of gas causes the formation of a suspension which may weigh from 10 to 30 pounds per cubic foot, and depending upon the amount of catalyst present in the reactor, the dense suspension will have an upper level at some point (L) in the reactor. The conditions maintained in the reactor are as follows:

|  | Broad Range | Preferred Range |
|---|---|---|
| Temperature, °F. | 325–550 | 350–475 |
| Pressure, Atmospheres | 1–50 | 1–35 |
| Linear Velocity, Ft./Sec. | 0.2–5.0 | 0.2–1.5 |
| Catalyst Concentration Lbs./Cu. Ft. | 5–50 | 10–50 |
| Feed Rate, Cu. Ft. CO/Hr./Lb. of Catalyst | 0.50–35 | 0.75–10 |

The reaction products issue overhead from reactor 10 after undergoing the indicated treatment through line 12 and are thereafter treated in the manner which goes to the heart of the present invention, which treatment will be described in detail hereinafter. But first, with respect to the reactor 10, it should be pointed out that a plurality of so-called "cyclone" separators, that is, gas-solid separating devices, are usually disposed in the top of the reactor in the space S for the purpose of causing the separation of entrained catalyst from the issuing gas and the return of the said catalyst to the main body of the catalyst between a foraminous member G and the upper level L. As previously indicated, by proper "loading" or maintenance of the amount of catalyst in the reactor so that its upper dense phase level is at L, there will be a disengaging space S above L in which the density of the suspension is very low. When this dilute suspension has passed through the separators indicated by reference character M (of which there may be say, 10 or more), the gas stream in line 12 contains only a minor quantity of catalyst fines. It is desirable periodically or even continuously to withdraw catalyst through a standpipe 13 and to subject it to a washing operation to remove therefrom waxy material and heavy oils. The purification of the catalyst and its return to the reaction zone do not form a part of the present invention and need not be illustrated because methods for purifying catalyst are known in the art.

Referring again to the crude product in line 12, the same is passed into a fractional distillation zone 20 where it is separated into a plurality of fractions as follows: first, the normally gaseous material is withdrawn overhead through line 21; second, a naphtha fraction boiling up, say, to 400° F. is recovered through line 22. The gas oil fraction is withdrawn through line 24 and finally heavy bottoms may be withdrawn through line 26.

The fraction in line 22, as previously indicated, would be largely straight chain paraffins and it would require treatment to improve its quality as gasoline. To this end, therefore, I propose to subject it to aromatization employing a satisfactory aromatization catalyst, such as chromium oxide supported on a suitable carrier, such as activated "alumina" but I prefer to use as a catalyst molybdenum oxide carried on zinc spinel. This catalyst is compounded by co-precipitating zinc oxide and aluminum oxide to form zinc aluminate, drying and activating by heating, and thereafter incorporating into the zinc spinel base a quantity of molybdenum oxide so that the final catalyst contains 90% of zinc spinel base and about 10% of molybdenum oxide. The catalyst is contained in a treating zone 23, and in one modification of my invention, the catalyst $C_1$ is in the form of pills, pellets, or other shaped bodies supported on foraminous member $G_1$. In this aromatizing zone straight chain aliphatic hydrocarbons are formed into aromatics under the following conditions:

|  | Broad | Preferred |
| --- | --- | --- |
| Temperature, °F | 900–1,000 | 940–960 |
| Pressure, Lbs./Sq. in | 0–100 | 40–60 |
| Cycle Length, Minutes | 1–120 | 60 |
| Feed Rate, V./V./Hr | 0.2–1.3 | 0.4–0.6 |
| $H_2$ Recycle, Cu. Ft./Bbl. of Feed | 0–2,500 | 1,400–1,600 |

It has been further found that this treatment in a once-through operation results in conversions as high as 65%.

The crude aromatized product is withdrawn from treater 23 through line 25 and passed into a separation drum 26 from which a hydrogen-containing gas may be withdrawn overhead through line 29 while the liquid product may be withdrawn through line 30 and collected in a receiving drum 32.

Referring back to the gas oil fraction in line 24, the same is in one modification of my invention mixed with hydrogen in line 28, passed through a heating coil 31 disposed in a suitable furnace setting 33, thence withdrawn through line 34 and passed through a destructive hydrogenation reactor 35 containing a suitable catalyst, such as a V or VI group metal oxide carried on activated alumina or other suitable support or a mixture of heavy metal sulfides, such as a mixture of nickel sulfide and tungsten sulfide or any of the known metal oxides or sulfides or mixtures of the same which have previously been used for this type of operation. It is pointed out that since the Fischer product has a very low sulfur content, the destructive hydrogenation thereof may be conducted in the presence of sulfur sensitive catalysts which are not suitable for use with feeds having a high sulfur content. Thus, catalyst such as metallic nickel carried on a support such as HF-treated Super Filtrol is preferred.

The conditions maintained in the destructive hydrogenation unit 35 are as follows:

|  | Broad | Preferred |
| --- | --- | --- |
| Temperature, °F | 500–700 | 550–650 |
| Pressure, Lbs./Sq. In | 500–3,000 | 1,000–3,000 |
| Feed Rate, V./V./Hr | 0.5–5.0 | 1.0–2.0 |
| $H_2$, Cu. Ft./Bbl. Fresh Feed | 1,000–5,000 | 1,500–2,500 |

For each barrel of oil from 2000 to 4000 cu. ft. of hydrogen are fed to the reactor. Under these conditions, the gas oil undergoes destructive hydrogenation to form a crude product in line 40 which boils within the gasoline range and contains substantial quantities of high octane constituents. However, instead of subjecting the gas oil to destructive hydrogenation, it is sometimes preferable to provide in treater 35 a cracking catalyst, such as an activated cracking clay, such as Super Filtrol or a synthetic catalyst comprising a plural gel of silica and alumina or silica and magnesia. In this case, of course, hydrogen is usually not mixed with the oil and the cracking is carried out under normal conditions, that is, temperatures of 850 to 950° F., atmospheric pressure, and feed rates of from ½ to 2 volumes of oil per volume of catalyst per hour. The product in line 40 in this case, therefore, would be subjected to distillation in a fractional distillation column 50 to recover normally gaseous material overhead through line 52, cracked gasoline through line 55, and unconverted material through line 60. The cracked gasoline in line 55 is condensed in the coil 57 and collected in the receiving drum 58. The normally gaseous material in line 52, which may contain from $C_1$ to $C_4$ hydrocarbons, may be processed in known manner to recover desired products. For instance, butylenes may be employed to alkylate isoparaffins or they may be dehydrogenated to form butadiene, a valuable intermediate in the preparation of rubber-like material. The unconverted material in line 60 is preferably recycled through line 24 for further treatment. However, since it contains coke-forming constituents, such as aromatics having two or more benzene rings in a condensed nucleus, it is preferable to hydrogenate the cycle stock, and to this end it is passed through a heating coil 62, thence mixed with the hydrogen from line 28 and caused to flow through a hydrogenation zone 70 containing a suitable hydrogenation catalyst $C_3$, such as a metal of the iron group supported on a carrier, where it is subjected to a mild hydrogenation, say, to a temperature of 200° F. to 500° F. and pressures of 0 to 30 lbs. per square inch gauge and feed rates of 0.1 to 2.0 v./v./hr. to convert the aromatics and olefins into naphthenes and paraffins and thereafter the hydrogenated stock may be returned to line 24 for further treatment. Since this final stock has a low sulfur content, the catalyst employed may be metallic nickel carried on a support such as kieselguhr or clay. The conditions set forth for the mild hydrogenation immediately above are those which may be used with a very active catalyst which is at the same time sulfur sensitive. If less active sulfur resistant catalysts such as the sulfides of the metals of the VI or VIII group are used, more severe conditions are required. In this case, temperatures of 350° F. to 600° F., pressures of from 100 to 750 lbs. per square inch gauge, and feed rates of from 0.2 to 2 volumes of feed per volume of catalyst per hour are suitable. With either type of catalyst the amount of hydrogen added is from 2000 to 6000 cubic feet per barrel feed. It is my intention to use the very active sulfur-sensitive catalyst when treating Fischer products and therefore in the preferred modification of my invention where a Fischer product is to be hydrogenated for one purpose or another, I prefer to use a catalyst such as metallic nickel carried on a suitable support or any other very active hydrogenation catalyst.

Now, referring again to the naphtha fraction obtained from the original synthesis material, instead of taking a fraction boiling up to 400° F. and including the lighter ends, it may be desirable to subject to the aromatization a fraction boiling from 225° F. to 400° F. or thereabouts. Since the lighter ends, that is, the material boiling up to perhaps 225° F., will contain olefins, it may not require treatment to improve its octane rating. On the other hand, the heavier ends will be improved by the aromatization and/or isomerization effected in reactor 23. Eventually, of course, the gasoline which has been aromatized and then formed by catalytic cracking may be combined to produce a product of improved octane rating.

In order to illustrate my invention, I set forth below a working example with the understanding that the example is not to be construed as placing any limitation on my invention.

A synthesis gas containing 60% hydrogen and 30% carbon monoxide and having a low sulfur content was treated at an average temperature of 380° F. with a catalyst containing 32% cobalt and 5% thorium as thorium oxide on a kieselguhr support. The operation was carried out at atmospheric pressure with a feed rate of 100 volumes of gas per hour per volume of catalyst. In this reaction a yield of 165 cc. of liquid hydrocarbons was obtained per cubic meter of ideal synthesis gas. In addition there was a yield of 12 grams of $C_3$ and $C_4$ hydrocarbons per cubic meter of gas plus a small quantity of wax.

The liquid product was cut into two equal fractions; one boiling up to 425° F. and the other from 425° F. to 860° F. The lower boiling fraction was treated to remove constituents boiling below 175° F. and the remainder of the fraction was treated with an aromatization catalyst consisting of molybdenum oxide supported on a zinc spinel base. The reaction was carried out at a temperature of 950° F. and 25 pounds per square inch pressure, at a feed rate of one volume of feed per volume of catalyst per hour. The feed was diluted with two parts of hydrogen per part of vaporized feed. The yields obtained from this reaction were 3.6% by weight of coke, 4 volume per cent of heavy liquid hydrocarbons and 76.7% of gasoline which had a CFR research octane number of 71.0 and an ASTM octane number of 65.2.

The heavy fraction of the Fischer product was subjected to destructive hydrogenation in an autoclave for a 12-hour period with 40 weight per cent of catalyst consisting of metallic nickel on an HF-treated clay which had been previously activated with sulfuric acid. The temperature was 600° F. and the pressure 3000 pounds per square inch. From this reaction there was obtained an 83 weight per cent yield of gasoline which had a clear blending octane number by the ASTM method of 86.

To recapitulate briefly, my present invention involves the synthesis of hydrocarbon oil from carbon monoxide and hydrogen to form normally liquid hydrocarbons and the subsequent treatment of this oil to form a gasoline of improved octane number by a combination of aromatization of the naphtha fraction and either destructive hydrogenation or catalytic cracking of the gas oil fraction. The hydrogen formed during the aromatization of the naphthas may be employed in the destructive hydrogenation of the gas oil or alternatively, if the gas oil is to be cracked, the hydrogen may be used to saturate the cycle stock.

It should be pointed out, of course, that in the cracking and aromatizing steps it will be necessary periodically to regenerate the catalyst since both of these operations unavoidably result in the deposition of coke on the catalyst thereby impairing its activity. As is well known to those skilled in the art, the catalyst may be purified by burning the coke on the catalyst under carefully controlled conditions to avoid overheating and fusing of the catalyst.

It is obvious that numerous modifications of my invention will suggest themselves to those who are familiar with this art, without departing from the spirit thereof.

What I claim is:

1. A method of producing gasoline synthetically which comprises causing a mixture of carbon monoxide and hydrogen to contact at elevated temperature a suitable powdered synthesis catalyst formed into a dense, fluidized suspension with the synthesis gases in the synthesis zone to form a quantity of hydrocarbons boiling in both the gasoline and gas oil ranges, withdrawing the product from the synthesis zone, fractionating the product to form a naphtha fraction containing all the normally liquid hydrocarbons boiling up to about 400° F. and a gas oil fraction boiling about about 400° F. up to about 860° F., subjecting said naphtha fraction as a whole to aromatization, subjecting said gas oil fraction to a catalytic treatment involving cracking and recovering from the aromatization and the catalytic treatment involving cracking a quantity of gasoline of improved octane rating.

2. The method of claim 1 in which the synthesis catalyst comprises metallic cobalt.

3. The method of claim 1 in which the hydrocarbon synthesis is conducted at a temperature in the range of from about 350° F. to 475° F.

4. The process of claim 1 in which said catalytic treatment is catalytic cracking.

5. The method of claim 1 in which said aromatization is carried out in the presence of a catalyst consisting essentially of a major proportion of a zinc-alumina spinel and a minor proportion of a Sixth Group metal oxide.

6. The method of claim 1 in which said aromatization is carried out in the presence of a catalyst consisting essentially of about 90% of zinc-alumina spinel base and about 10% of molybdenum oxide.

7. The process of claim 1 in which said catalytic treatment is destructive hydrogenation.

SUMNER B. SWEETSER.

REFERENCES CITED

The following references are of record in the file of this patent:

UNITED STATES PATENTS

| Number | Name | Date |
|---|---|---|
| 1,984,380 | Odell | Dec. 18, 1934 |
| 2,045,794 | Pier | June 30, 1936 |
| 2,205,434 | Phinney | June 25, 1940 |
| 2,224,003 | Pier et al. | Dec. 5, 1940 |
| 2,228,118 | Kaufmann et al. | Jan. 7, 1941 |
| 2,242,321 | Pier et al. | May 20, 1941 |
| 2,264,427 | Asbury | Dec. 2, 1941 |
| 2,289,716 | Marschner | July 14, 1942 |
| 2,312,445 | Ruthruff | Mar. 2, 1943 |
| 2,344,330 | Sturgeon | Mar. 14, 1944 |
| 2,354,261 | Hemminger | July 25, 1944 |
| 2,357,271 | Taylor et al. | Aug. 29, 1944 |
| 2,360,463 | Arveson | Oct. 17, 1944 |
| 2,360,787 | Murphree et al. | Oct. 17, 1944 |
| 2,371,355 | Ross et al. | Mar. 13, 1945 |
| 2,410,891 | Meinert et al. | Nov. 12, 1946 |

Certificate of Correction

Patent No. 2,471,914.　　　　　　　　　　　　　　　　　　May 31, 1949.

SUMNER B. SWEETSER

It is hereby certified that error appears in the printed specification of the above numbered patent requiring correction as follows:

Column 6, line 17, claim 1, for the words "about about" read *above about*; and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*